(12) United States Patent
Pedersen

(10) Patent No.: US 6,369,879 B1
(45) Date of Patent: Apr. 9, 2002

(54) METHOD AND APPARATUS FOR DETERMINING THE COORDINATES OF AN OBJECT

(75) Inventor: Paul S. Pedersen, Los Alamos, NM (US)

(73) Assignee: The Regents of the University of California, Los Alamos, CA (US)

( * ) Notice: Subject to any disclaimer, the term of this patent is extended or adjusted under 35 U.S.C. 154(b) by 0 days.

(21) Appl. No.: 09/851,188

(22) Filed: May 4, 2001

Related U.S. Application Data

(63) Continuation-in-part of application No. 09/695,811, filed on Oct. 24, 2000.

(51) Int. Cl.⁷ .............................. G01C 3/00; G01C 3/08; G01C 5/00
(52) U.S. Cl. ...................... 356/3.01; 356/3.05
(58) Field of Search .............................. 356/3.01–3.16, 356/141.1

(56) References Cited

U.S. PATENT DOCUMENTS

| | | | |
|---|---|---|---|
| 4,349,277 A | 9/1982 | Mundy et al. | 356/376 |
| 4,564,295 A | 1/1986 | Halioua | 356/376 |
| 4,641,972 A | 2/1987 | Halioua et al. | 356/376 |
| 4,657,394 A | 4/1987 | Halioua | 356/376 |
| 4,802,759 A | 2/1989 | Matsumoto et al. | 356/337 |
| 5,085,592 A | 2/1992 | Womack et al. | 356/376 |
| 5,280,542 A | 1/1994 | Ozeki et al. | 382/8 |
| 5,289,264 A | 2/1994 | Steinichler | 356/376 |
| 5,381,236 A * | 1/1995 | Morgan | 356/376 |
| 5,418,608 A * | 5/1995 | Caimi et al. | 356/3.01 |
| 5,531,227 A | 7/1996 | Schneider | 128/653.1 |
| 5,598,265 A * | 1/1997 | de Groot | 356/360 |
| 5,636,025 A | 6/1997 | Bieman et al. | 356/374 |
| 5,677,522 A | 10/1997 | Rice et al. | 235/454 |
| 5,706,085 A * | 1/1998 | Blossey et al. | 356/357 |
| 5,724,447 A | 3/1998 | Fukushima | 382/211 |
| 5,784,098 A | 7/1998 | Shoji et al. | 348/45 |
| 5,864,145 A | 1/1999 | Krimermann et al. | 250/559.29 |
| 5,877,800 A * | 3/1999 | Robinson et al. | 347/255 |
| 5,880,846 A | 3/1999 | Hasman et al. | 356/376 |
| 5,929,980 A | 7/1999 | Yamaguchi et al. | 356/4.03 |
| 6,012,003 A | 1/2000 | Astrom | 701/28 |
| 6,031,612 A | 2/2000 | Shirley | 356/359 |
| 6,040,910 A * | 3/2000 | Wu et al. | 356/376 |
| 6,055,056 A | 4/2000 | Kuehmstedt et al. | 356/376 |
| 6,075,605 A * | 6/2000 | Futamura et al. | 356/376 |
| 6,100,517 A | 8/2000 | Yahav et al. | 250/208.1 |
| 6,133,988 A * | 10/2000 | Rheme et al. | 356/3.01 |
| 6,147,760 A * | 11/2000 | Geng | 356/376 |
| 6,233,049 B1 | 5/2001 | Kondo et al. | 356/376 |
| 6,252,623 B1 | 6/2001 | Lu et al. | 348/47 |
| 6,252,659 B1 | 6/2001 | Norita et al. | 356/376 |

OTHER PUBLICATIONS

Osten et al., "General Hierarchical Approach in Absolute Phase Measurement," SPIE vol. 2860, pp. 2–12.

* cited by examiner

Primary Examiner—Thomas H. Tarcza
Assistant Examiner—Brian Andrea
(74) Attorney, Agent, or Firm—Ray G. Wilson

(57) ABSTRACT

A simplified method and related apparatus are described for determining the location of points on the surface of an object by varying, in accordance with a unique sequence, the intensity of each illuminated pixel directed to the object surface, and detecting at known detector pixel locations the intensity sequence of reflected illumination from the surface of the object whereby the identity and location of the originating illuminated pixel can be determined. The coordinates of points on the surface of the object are then determined by conventional triangulation methods.

15 Claims, 3 Drawing Sheets

METHOD AND APPARATUS FOR DETERMINING THE COORDINATES OF AN OBJECT

RELATED APPLICATIONS

This application is a C-I-P of U.S. patent application Ser. No. 09/695,811, filed Oct. 24, 2000.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The invention pertains generally to methods for determining the position and surface contours of an object and, more particularly, to a method for determining surface coordinates by directing intensity modulated illumination toward the surface of an object and identifying the source of the modulated illumination from the detected modulation pattern, whereupon the object coordinates may then be determined by triangulation.

BACKGROUND OF THE INVENTION

There are numerous applications that require a determination of the coordinates of the surface of an object, or the coordinates of reflective elements beneath that surface. Typical application areas include industrial plants, laboratories, microscopy, and the metrology field in general. Various optical methods have been employed that utilize arrangements of light sources to detect contour information. These methods are often employed within instruments such as coordinate measuring machines, three-dimensional topometric sensors, and laser triangulation sensors.

One common method of performing surface coordinate measurements is to project a lighted grid of lines onto the surface of an artifact, capture the reflected image on an image sensor, and then analyze the image data. The distortion of the grid within the image may be analyzed to discern the shape of the object. The grid lines may be mapped to ascertain the angles of the beams and the coordinates of the points of intersection. Triangulation is typically utilized during the process of calculating the coordinates of the object surface once sufficient angle and position data is obtained.

It will be appreciated that a right triangle can be resolved given any two sides, or an angle and a side. FIG. 1 is a two-dimensional diagram of triangulation being performed to resolve the position of point P', wherein a ray of light from a known location P and direction θ is reflected from the surface of the object at point P' and is detected at a location P". A pair of right triangles is formed that may be solved for the coordinates of location P" once the distance or additional angular information is known.

Methods of determining object coordinates often rely on a method of scanning the surface of the object point-by-point or line-by-line, and resolving the point positions of the object serially. However, sequential methods of plotting the coordinates of an object surface are slow and not well suited for use on vibrating or moving objects. The coordinates of object points may also be determined by creating interference patterns in the region near the surface using multiple illumination sources, such that the reflected patterns disclose changes in field depth as a series of interference fringes.

In another method, predetermined displacements of a projected light grid having a sinusoidal pattern are mechanically generated, as by rotating an aperture. The reflected light from the object is detected by an image sensor so that the response to the angular displacement for the aperture is evaluated by a phase-shift method (or Fourier transform) to determine the incoming angle of the light. The object location is then solved by triangulation. The two grating positions may be generated simultaneously using multiple wavelengths of light, such as colors in the visible spectrum, which are resolved by a detector individually responsive to each of the wavelengths. The utility of this technique and its accuracy are dependent on the surface characteristics of the object and require substantial precision with regard to the gratings and their rotation.

The aforementioned methods of determining the coordinates of an object surface suffer from a number of drawbacks, such as being typically slow, while many of the methods inherently lack mathematical precision. Therefore, a need exists for an efficient method of determining object position under a variety of conditions and which does not rely on image distortion, sequential scanning, interference patterns, or pixel position rotations. The present invention satisfies those needs, as well as others, and overcomes the deficiencies of previously developed solutions.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to an apparatus for determining the coordinates of points on the surface of an object. A modulated light source has pixels whose light intensity may be individually modulated, wherein the light source is directed toward the object. An image detector has a plurality of pixels for receiving light reflected from the surface of the object. Then, a computer, or the like, determines the coordinates of points on the surface of the object wherefrom pixels of light are reflected from the surface of the object, wherein the determination is responsive to the relative location of pixels registered on the imaging detector such that a sequence of intensity values detected by pixels of the image detector are correlated with a unique signature of light intensity values transmitted by pixels of the light source from which the location of the associated point of reflection from the surface of the object may be determined by triangulation from known locations of the image detector pixels and light source pixels.

Accordingly, the invention is a simplified method for determining the location of the points on the surface of an object by varying, in accord with a unique sequence, the intensity of each illuminated pixel directed to the object surface, and detecting at known detector pixel locations the intensity sequence of reflected illumination from the surface of the object whereby the identity and location of the originating illuminated pixel can be determined.

Various features of the invention will be brought out in the following portions of the specification, wherein the detailed description is for the purpose of fully disclosing preferred embodiments of the invention without placing limitations thereon.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
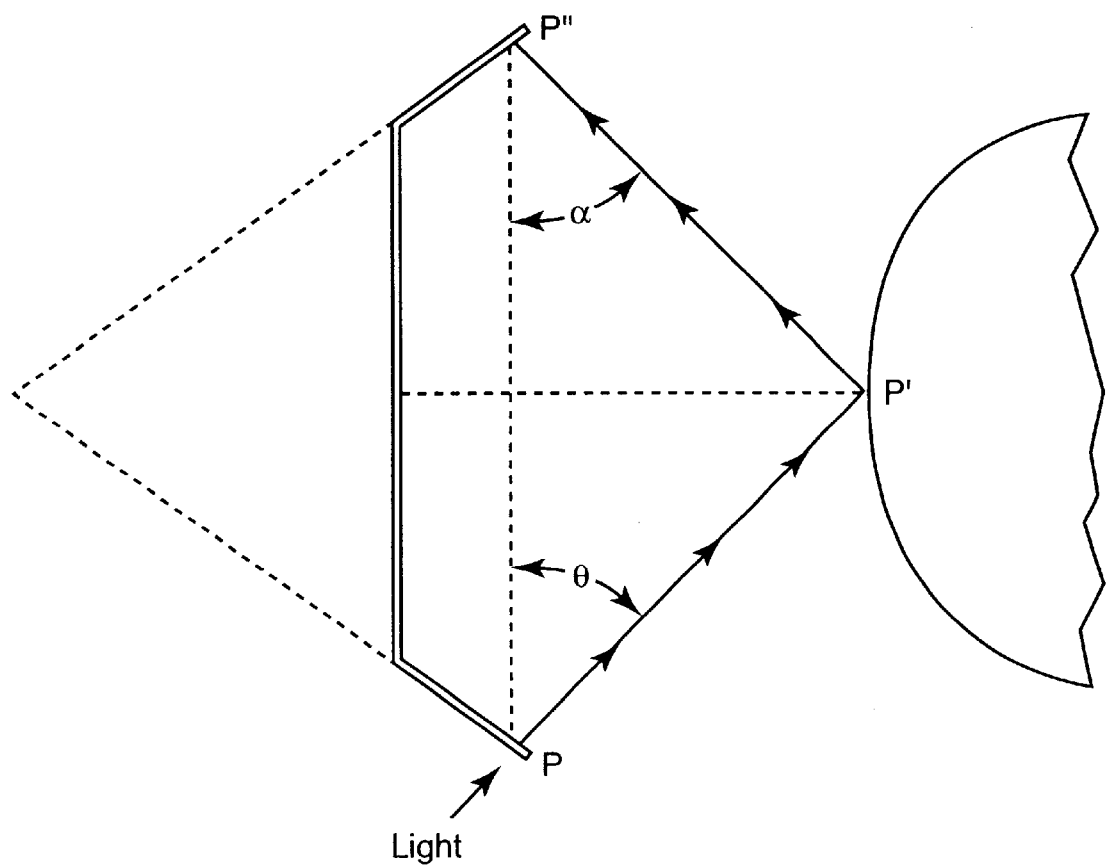
FIG. 1 is a diagram illustrating conventional triangulation for resolving the position of a point on the surface of an object.
Figure 2:
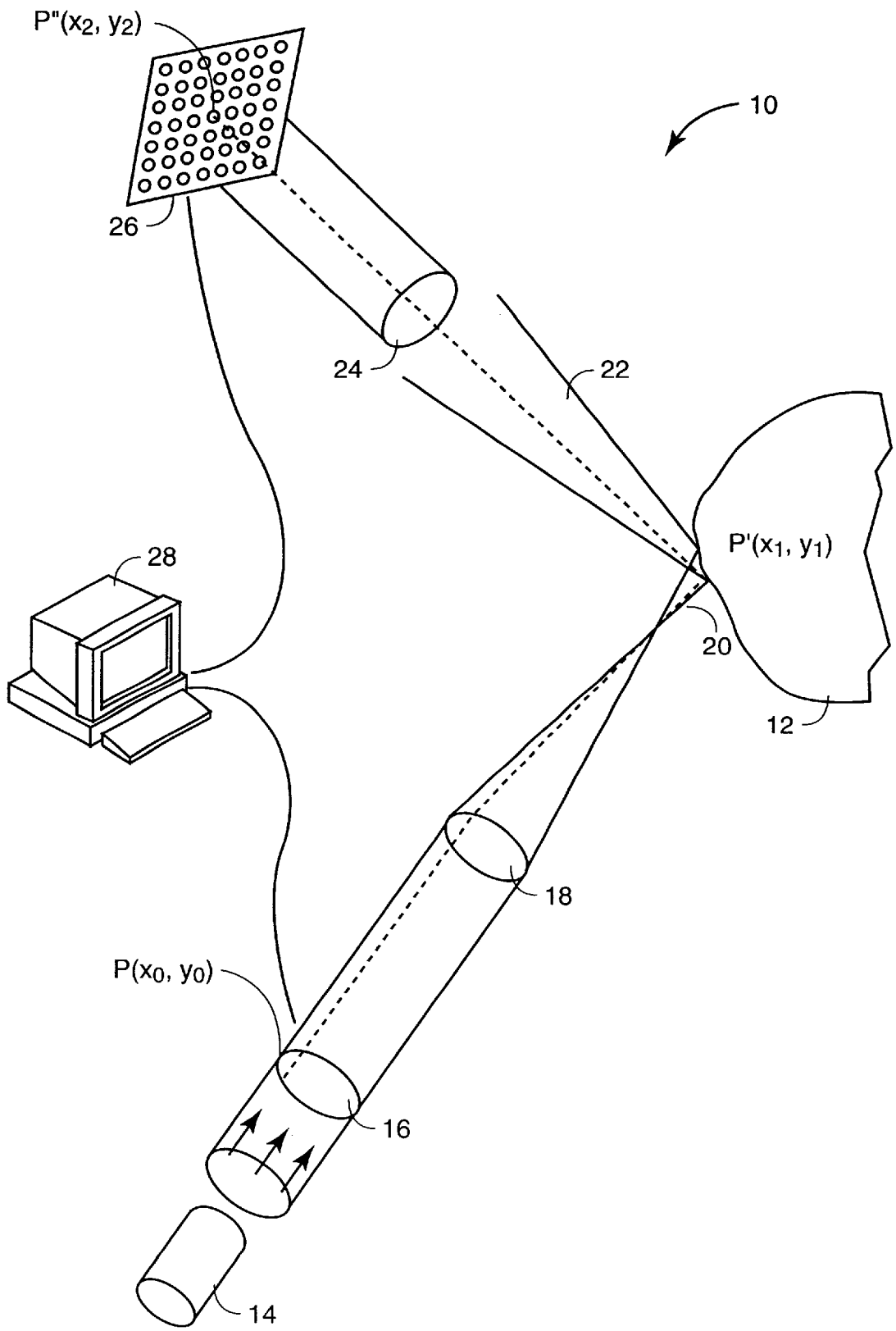
FIG. 2 is a schematic of optical components within an apparatus for determining the coordinates of an object according to an embodiment of the present invention.
Figure 3:
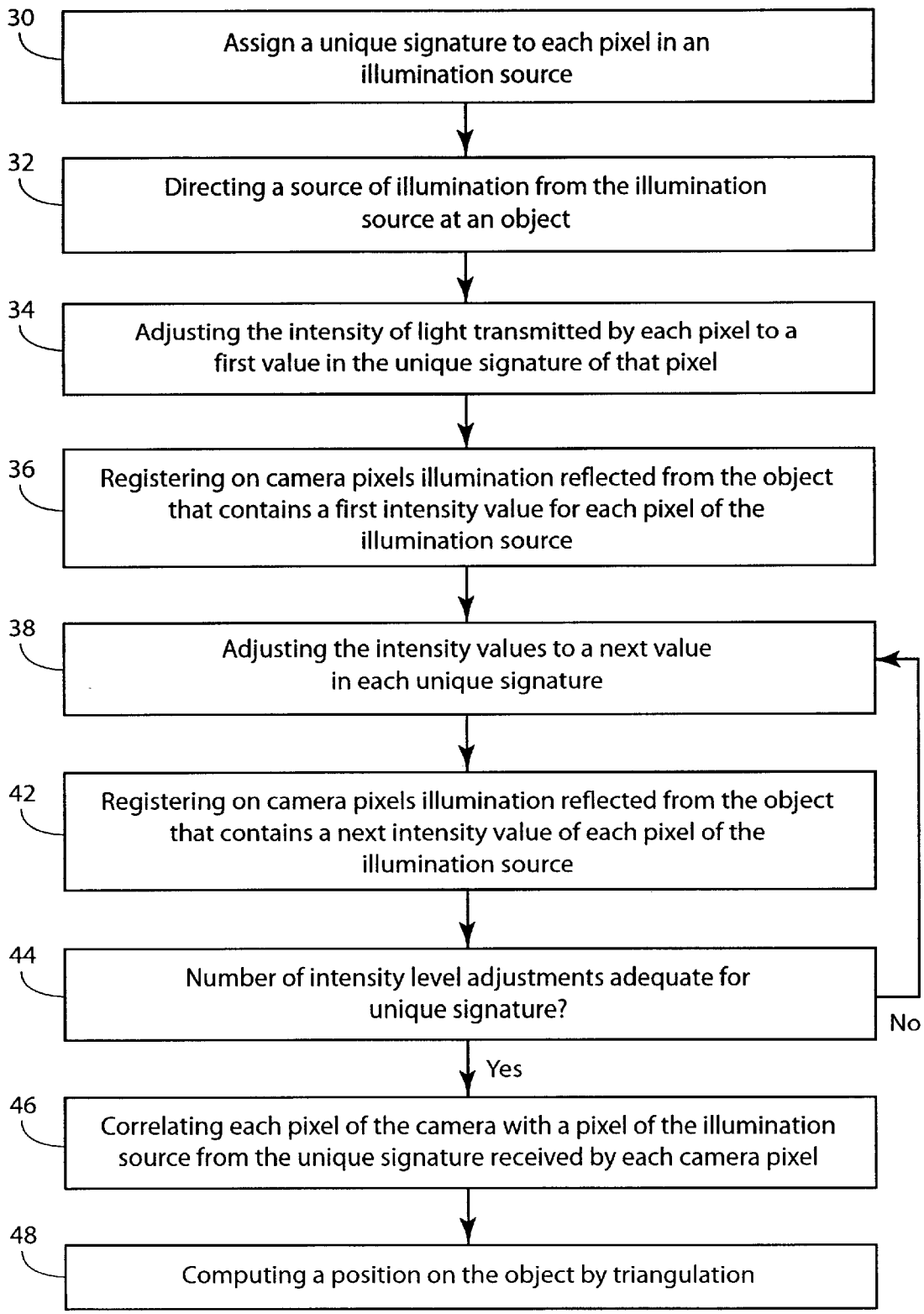
FIG. 3 is a flowchart of a method for determining coordinates of an object according to an embodiment of the present invention shown describing an encoding method for the unique signature for pixels of the illumination source.

Referring more specifically to the drawings, for illustrative purposes the present invention is embodied in the apparatus and method generally shown in FIG. 2 and FIG. 3. It will be appreciated that the apparatus may vary as to configuration and as to details of the parts, and that the method may vary as to the specific steps and sequences, without departing from the basic concepts as disclosed herein.

Referring to FIG. 2, an apparatus 10 is shown schematically for determining the location of coordinate points on an object 12 by detecting a reflected intensity according to the present invention. The apparatus includes a source of illumination 14, which is preferably a visible white light source, although any form of illumination may be utilized. The illumination source passes through an optical intensity modulator 16, which is preferably a liquid crystal window having a system of pixels, typically arranged in an array, whose light transmittance qualities are independently adjustable from opaque to transparent.

Intensity modulator 16 provides intensity control for individual pixels of the illumination. The illumination passes through the plane of intensity modulator 16, at P, as rays that are orthogonal to the plane of intensity modular 16. The intensity modulator is computer-controlled by a general purpose computer or dedicated firmware, or the like. Alternatively, the intensity modulator may comprise an illumination source where each pixel is capable of intensity modulation, such as an array of laser diodes. It should be appreciated that various methods exist for providing controlled modulation of illumination.

The beam of illumination is collected by a lens 18 that is focused on an area 20 impinging on object 12, at P'. The illumination impinging on the object may be considered a collection of points in relation to the pixels of modulated illumination being transmitted through intensity modulator 16. Reflected illumination 22 from the surface of object 12 is received by a lens 24 and directed onto an image receiver 26, preferably a charge coupled device (CCD) camera, but any light sensitive device having a spatial and intensity resolution of received light could be used. Light receiver 26 will be referred to herein as a CCD, but this is not to be construed as limiting the scope of the claims herein. A computer 28 is shown connected to the intensity modulator 16 to control the pixel intensities therein, and to CCD 26 for receiving pixel intensity information. It will be appreciated that although the use of a computer system is preferred, any device or combination of hardware capable of performing the required correlations may be utilized.

In accordance with the present invention, a pixel in intensity modulator 16 can be uniquely correlated with the location of a single excited pixel on CCD 26. This one-to-one correspondence can be established even with some unknown loss in light intensity between modulator 16 and CCD 26.

One ray of the illumination is shown by the dashed line passing through intensity modulator 16 at a location $P(x_0,y_0)$ to impinge on the object at a point $P'(x_1,y_1)$ and reflected off of object 12 through lens 24 and received at position $P''(x_2,y_2)$ on CCD 26. The plane of CCD 26 is generally configured orthogonal to the incoming illumination whose reflected angle from the object is equal to the angle of incidence. CCD 26 may further be adapted to restrict the receipt of spurious illumination from locations other than the object surface being illuminated.

It will be appreciated that lenses 18, 24 are utilized to provide a mechanism for obtaining high resolution coordinate positions from the surface of the object. However, it will also be recognized that in lower-resolution applications the lenses will be unnecessary if the source of illumination is properly configured.

The present invention is capable of determining the position and distance of each pixel at P on intensity modulator 16 which corresponds to locations of pixels received at P'' on the CCD imager. The coordinates of a pixel on intensity modulator 16 can be determined without regard to losses of illumination intensity due to the intervening spaces, and absorption within the lens and object. In accordance with the present invention, the intensity of light transmitted by pixels comprising intensity modulator 16 can be modified a selected number of times, Q, and a corresponding received light intensity is received, whereby a correspondence between a transmitting pixel and a receiving pixel is established.

A ray of light R from illumination source 14 traverses the apparatus as follows:

$$R \to M \to L_1 \to A \to L_2 \to CCD \qquad (1)$$

where M represents intensity modulator 16, $L_1$ represents first lens 18, A represents the artifact (object) 12, $L_2$ represents second lens 24 for directing the reflected light, and CCD represents the charge-coupled device image sensor 26 capturing the reflected light. Based on the foregoing, the illumination intensity received at the CCD pixel P'' which corresponds to the illumination intensity originating from $P(x_0,y_0)$ has the form:

$$I(P''(x_2,y_2)) = D(x_0,y_0) \times I(P(x_0,y_0)) \qquad (2)$$

where $D(x_0,y_0)$, $D \neq 0$, represents a reduction in transmitted light intensity during traverse of the system. The values $x_0$ and $y_0$ are the coordinates of the corresponding pixel at intensity modulator 16. By varying the intensity values of the modulator 16 pixels in accord with the present invention, the unknowns $x_0$, $y_0$ are determined from the illumination received at CCD 26 at $P''(x_2,y_2)$.

To simplify the explanation herein, assume that the number of pixels is the same at the intensity modulator and the CCD, that the number of intensity levels that can be modulated at the intensity modulator and detected at the CCD is the same, and that the intensity modulator pixels map one to one onto the CCD pixels. Intensity modulator 16 may be formed from a liquid crystal display (LCD) or may be formed from individual light emitting diodes (LEDs). Modulator 16 will hereinafter be referred to as an LCD, but the scope of the claims is not intended to be limited by this reference nomenclature.

Assume that the number of pixels is P at both the LCD and the CCD, that the number of intensity levels that can be modulated at each LCD pixel is N, that these N intensity levels can be detected and differentiated at each CCD pixel (after traverse of the system), and that the light transmitted by each LCD pixel maps onto exactly one CCD pixel.

Since there are P pixels, each LCD pixel is uniquely identified with a number in the range 0 to P−1. The notation $u_i$ denotes the $i^{th}$ pixel where $0 \leq i \leq P-1$.

The N intensity levels that can be modulated at the LCD are designated $0 \leq l_0 < l_1 < \ldots < l_{N-1} \leq 1$. The value 0 means that no light to passes through the pixel and the value 1 means that all the light passes through the pixel.

Each LCD pixel is modulated Q times and the results detected at each pixel of the CCD. Each such modulation is called a shot herein. The goal is to vary the intensity levels between LCD pixels and between shots in such a manner that when the resulting intensity levels are detected at each pixel of the CCD the one to one correspondence between the LCD pixels and the CCD pixels can be determined.

As mentioned earlier, the number of shots (Q) required to get this one to one correspondence depends on the number of pixels (P) and the number of intensity levels (N) that can be modulated at the LCD and detected at the CCD. The value of Q and the variation of intensity levels between pixels and between shots are generated in such a manner that the one to one correspondence between the LCD pixels and the CCD pixels is determined.

On shot k($0 \leq k \leq Q-1$) the intensity of light transmitted by LCD pixel $u_i$ will be written as $I_k(LCD, u_i)$ and this value will be one of $l_0, l_1, \ldots, l_{N-1}$. If pixel $u_i$ is modulated to allow intensity level $l_j$ to be transmitted, the intensity of light detected at the CCD will be $D(u_i) \times l_j$. The fraction of the light left after absorption by the system is represented by $0 < D(u_i) \leq 1$, which may to vary from pixel to pixel. The light intensity detected at some CCD pixel due to the light coming from LCD pixel $u_i$ and shot k will be $D(u_i) \times I_k(LCD, u_i)$. The problem is to deduce the LCD pixel $u_i$ that was the light source if, at a CCD pixel, the sequence of intensity values $D(u_i) \times I_k(LCD, u_i)$ for $0 \leq k \leq Q-1$ that result from the Q shots is detected.

To solve this problem, in accordance with the present invention, a unique signature or fingerprint sequence of intensity values is assigned to every LCD pixel. This signature will consist of a sequence of Q intensity values that uniquely identifies the LCD pixel and distinguishes it from the signature of any other LCD pixel. When a signature of pixel $u_i$ is detected at a CCD pixel, the light must originate from pixel $u_i$ and so the one to one correspondences between the LCD and CCD pixels are established.

One analog is Morse code, where each letter of the alphabet is assigned a unique sequence of dots and dashes. When a message is received in Morse code the message can be decoded even if some (but not all) of the intensity of the transmission is lost.

The length of the smallest sequence that can be used to give a unique fingerprint is $$Q = \text{ceiling}(\log_N(P)),$$

where the ceiling of a real number is the nearest whole number greater than or equal to the real number (see appendix). A way for calculating $\log_N(P)$ is described in the appendix. A procedure for assigning a unique signature to each pixel can be computed by using base N arithmetic and is again described in the appendix.

The Encoding Procedure

There are many ways for developing unique signatures for the pixels. One method is as follows:

First: Uniquely identify each LCD pixel with a number between 0 and P−1. Next write the numbers from 0 to P−1 in base N (see appendix). Pixel $u_i$, where $0 \leq i \leq P-1$, has a unique signature in the form $(d_{i,0}, d_{i,1}, \ldots, d_{i,Q-1})$, where $d_{i,k}$ comes from the set $\{0, 1, \ldots, N-1\}$ (see appendix).

Second: Modulate the light intensity of pixel $u_i$ with the signature $(d_{i,0}, d_{i,1}, \ldots, d_{i,Q-1})$ of that LCD pixel. For purposes of illustration, allow the amount of light transmitted by pixel $u_1$ on shot k to be $l_{d_{i,k}}$. The only requirement is that each LCD pixel have a distinct signature.

Third: When the same signature is detected at a CCD pixel, the illumination is identified as originating from LCD pixel $u_i$.

Fourth: Points on the artifact are then conventionally located by triangulation from the known source and detection point locations.

It is important to note that this procedure can be used to determine the one to one correspondence simultaneously for all pixels.

EXAMPLE 1

Assume that the number of pixels is $P = 2^{20} = 1,048,576$ and the number of intensity levels is N=2 (so $0 \leq l_0 \leq l_1 \leq 1$), i.e., two intensity levels are transmitted by each LCD pixel). Then a unique signature of length $Q = \text{ceiling}(\log_2(2^{20})) = 20$ is assigned to each pixel.

One way for assigning a unique signature to each pixel is as follows: List the LCD pixels as $u_i$ where $0 \leq i \leq 1,048,575$. Write each such i in binary form. So, $i = d_{i,0} + d_{i,1} \times 2 + \ldots + d_{i,19} \times 2^{19}$, where each $d_{i,k}$ comes from the set $\{0, 1\}$. Then $(d_{i,0}, d_{i,2}, \ldots, d_{i,19})$ becomes the signature for LCD pixel $u_i$.

The signature $(d_{i,0}, d_{i,2}, \ldots, d_{i,19})$ then modulates the light intensity transmitted by each pixel $u_i$ on each of the Q shots. On shot k, the light intensity level is $l_0$ from the pixel if $i_k=0$ and the light intensity level is $l_1$ through the pixel if $i_k=1$. The sequence of light intensities allowed through pixel $u_i$ for the Q shots will then be $(l_{d_{i,0}}, l_{d_{i,1}}, \ldots, l_{d_{i,19}})$. The intensity of the light received at the CCD from pixel $u_i$ for k will then be $D(u_i) \times l_{d_{i,k}}$. When the signature of $u_i$ is detected at a CCD pixel, the light is identified as originating from pixel $u_i$.

EXAMPLE 2

Assume that the number of pixels is $P = 2^{20} = 1,048,576$ and the number of intensity levels is N=16. Then we can assign a unique signature of length $Q = \text{ceiling}(\log_{16}(2^{20})) = 5$ to each pixel from which the one to one correspondance is determined.

Color Based Method

If L intensity levels in each of a system of colors C, e.g., the 3 additive primary light colors (Red, Green, Blue), are projected and detected, every pixel has a unique signature consisting of a sequence of $\text{ceiling}(\log_{C \times L}(P))$ color intensity values. The procedure is the same as being able to project and detect N=CL intensity values. So, for example, if there are 1,000,000 pixels and 35 intensity values in each of the three primary colors are detected, then each pixel has a unique signature of length $\text{ceiling}(\log_{3 \times 35}(1000000))$, which equals 3.

Referring now to FIG. 3, a flowchart is shown of the process steps for determining object coordinates according to the present invention. First, at block 30, a unique signature is assigned to each pixel in an illumination source. At block 32, the illumination source is directed toward an object. At block 34, the intensity of light transmitted by the illumination source pixels is adjusted to a first value in the unique signature of that pixel. The light transmitted by each pixel of the illumination source and reflected from the object is registered at some pixel in the image sensor at block 36. A next intensity pattern selected from the unique signatures of the illumination source pixels is selected at block 38, and its reflection is registered by the image sensor at block 42. The number of adjustments made to the intensities of the illumination source pixels is reviewed at block 44. If there have not been enough adjustments to establish the unique signatures of the pixels, the intensity values are again adjusted at block 38. If the unique signatures have been established, each camera pixel is correlated at block 44 with a pixel in the illumination source. Utilizing the correlated position values from the camera and illumination source pixels within the trigonometric relationships the coordinate positions of the object surface are thereby computed by triangulation at block 48.

It should be appreciated that the described embodiment and equations are a single aspect of the inventive method. It will be recognized that the modulated illumination source may provide a controlled areal illumination, or may provide a point-by-point or scanned illumination.

Although the description above contains many specificities, these should not be construed as limiting the scope of the invention but as merely providing illustrations of some of the presently preferred embodiments of this invention. Thus, the scope of this invention should be determined by the appended claims and their legal equivalents, Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

APPENDIX

I. Logarithm calculations:
$\log_N(P) = Q$ if and only if $N^Q = P$
So, for example, $\log_{16}(2^{20}) = 5$ because $16^5 = 1048576 = 2^{20}$.
To compute $\log_N(P)$ we can use the formula $\log_N(P) = \log_{10}(P)/\log_{10}(N)$ or the formula $\log_N(P) = \ln(P)/\ln(N)$. You can usually find the functions $\log_{10}(\ )$ and $\ln(\ )$ on calculators.

II. Ceiling calculation:
$\text{ceiling}(\log_{32}(1{,}000{,}000)) = \text{ceiling}(3.9863) = 4. \text{ceiling}(\log_{32}(32 \times 32)) = \text{ceiling}(2) = 2$.

III. Base 10 and base N arithmetic:
In base 10 arithmetic every whole number from 0 to $10^Q - 1$ is written uniquely in the form $b_0 + b_1 \times 10 + \ldots + b_{Q-1} \times 10^{Q-1}$ where the numbers $b_k$ come from the set $\{0, 1, 2, \ldots, 9\}$. So, for example, for $Q = 5$ the number 1023 really represents $1 + 0 \times 10 + 2 \times 10^2 + 3 \times 10^3 + 0 \times 10^4$. This is called the decimal or base 10 representation for the number.

Similarly given a whole number N greater than 1, every whole number from 0 to $N^Q - 1$ can be written uniquely in the form $b_0 + b_1 \times N + \ldots + b_{Q-1} \times N^{Q-1}$ where the numbers $b_k$ come from the set $\{0, 1, 2, \ldots, N - 1\}$. The resulting sequence $(b_0, b_1, \ldots, b_{Q-1})$ is called the base N representation for the number. So for example let $N = 5$ and $Q = 3$ then every whole number from 0 to $5^3 - 1 = 124$ can be written uniquely in the form $b_0 + b_1 \times 5 + b_2 \times 25$ where $0 \leq b_k \leq 4$.

There are well known algorithms for representing whole numbers in base N arithmetic.

What is claimed is:

1. An apparatus for determining the coordinates of points on the surface of an object, comprising:
   (a) a modulated light source having pixels whose light intensity output may be individually modulated, wherein the light source is directed toward the object;
   (b) an image detector having a plurality of pixels for registering light reflected from the surface of the object and outputting a light intensity value from each pixel; and
   (c) means for determining the coordinates of points on the surface of the object wherefrom pixels of light are reflected from the surface of the object, wherein the determination is responsive to the relative location of pixels registered on the imaging detector such that a sequence of intensity values detected by pixels of the image detector are correlated with a unique signature of light intensity values transmitted by pixels of the light source from which the location of the associated point of reflection from the surface of the object is determined by triangulation from known locations of the image detector pixels and light source pixels.

2. The apparatus as recited in claim 1, wherein the coordinate determining means comprises a computer system configured for controlling the modulated light source and that receives pixel intensity information from the image detector such that a correlation is made relating a sequence of modulated light intensity patterns with received light intensity patterns to determine object coordinates.

3. An apparatus for determining the coordinates of points on the surface of an object by sensing reflected illumination intensities, comprising:
   (a) means for emitting an illuminating beam toward an object, the beam having an area defined by a plurality of pixels;

(b) means for modulating the intensity of individual pixels forming the illuminating beam;

(c) means for detecting the illumination intensity of the illuminating beam which has been reflected from points on the surface of the object; and (d) means for correlating the position of each pixel at the point of modulation with the position of detected pixel illumination intensities from a unique signature of each one of the plurality of pixels forming the illuminating beam, from which the coordinates of the object may be resolved by triangulation.

4. The apparatus as recited in claim 3, wherein the emitting means comprises a high-intensity illumination source.

5. The apparatus as recited in claim 3, wherein the modulating means comprises a transmissive LCD array having pixels whose transmissivity may be varied.

6. The apparatus as recited in claim 3, wherein the detecting means comprises a CCD camera.

7. The apparatus as recited in claim 3, wherein the resolving means comprises a computer system configured for controlling the intensity of the illuminating pixels and receiving pixel intensity information from the detecting means, and further configured for determining the coordinates of the object by triangulation.

8. An apparatus for determining the coordinates of points on the surface of an illuminated object by sensing the intensity of reflected illumination, comprising:

(a) a source of illumination having a plurality of pixels whose intensity $I_n$ may be individually modulated Q times in a sequence that uniquely identifies each one of the plurality of pixels;

(b) an image sensor positioned to receive at a plurality of known locations the source of illumination as it reflects from the object; and (c) a computer processor coupled to the intensity modulator and the image sensor, the computer processor correlating sequences of intensity values received at image sensor locations with sequences of intensity values from the source of illumination from which the coordinates of object points may then be determined by triangulation.

9. The apparatus as recited in claim 8, wherein pixel intensities are modulated a minimum of Q times, where Q=ceiling($\log_N(P)$), P is the number of pixels of the source of illumination and N is number of intensity levels.

10. The apparatus as recited in claim 8, wherein the intensity of the pixels may be modulated by passing a beam of illumination through an intensity modulator, such as an LCD, which is capable of selectively transmitting all or a portion of the wavelength constituents of the illumination.

11. The apparatus as recited in claim 9, wherein the sequence of intensities $I_n$, specified for a point $P(x_0,y_0)$ at which each pixel $u_i$ ($0 \leq i \leq P-1$) is intensity modulated according to a unique signature ($d_{i,0}, d_{i,1}, \ldots, d_{i,Q-1}$), where $d_{i,k}$ is selected from the set $\{0,1,\ldots,N-1\}$.

12. The apparatus as recited in claim 11, wherein the intensity modulation transmits C colors and each color can be transmitted at L intensity levels so that N=CL.

13. A method for determining the coordinates of points on an object surface, comprising:

projecting a light from an optical intensity modulator onto an object whose coordinates are to be determined, wherein optical intensity is modulated to create a signature of light intensity patterns that uniquely identifies each pixel forming the optical intensity modulator;

receiving the light which has been reflected from the object onto discrete locations of an imaging device; and determining the coordinates on the object, wherein the determination correlates the discrete locations on the imaging device with specific ones of the intensity modulator pixels from the detected signature from specific intensity modulator pixels, wherefrom the coordinates of points on the object surface are then determined by triangulation.

14. A method of obtaining object coordinates by sensing reflected illumination, comprising:

illuminating an object with a beam of electromagnetic radiation having a plurality of pixels located at a point of intensity modulation whose intensity is individually modulated in a sequence that provides a unique signature for each pixel;

registering the location and intensity of the electromagnetic radiation reflected from the object at a sensor in response to the intensity sequence from each of the modulated pixels;

determining the position for each pixel at the point of intensity modulation from intensity sequences registered at the discrete locations on the sensor; and determining object coordinates from the discrete sensor locations and correlated pixels at the point of intensity modulation by geometric triangulation.

15. The method as recited in claim 14, wherein the intensity modulation generates a sequence of intensities $I_n$, specified for a point $P(x_0,y_0)$ at which each pixel $u_i$ ($0 \leq i \leq P-1$) is intensity modulated according to a unique signature ($d_{i,0}, d_{i,1}, \ldots, d_{i,Q-1}$), where $d_{i,k}$ is selected from the set $\{0,1,\ldots,N-1\}$.

* * * * *